(12) United States Patent
Yu et al.

(10) Patent No.: US 12,028,917 B2
(45) Date of Patent: Jul. 2, 2024

(54) METHOD AND APPARATUS FOR HANDLING PROTOCOL DATA UNIT SESSIONS IN A COMMUNICATION SYSTEM

(71) Applicant: Nokia Technologies Oy, Espoo (FI)

(72) Inventors: Ling Yu, Kauniainen (FI); Vinh Van Phan, Oulu (FI); Jani Moilanen, Helsinki (FI); David Navratil, Helsinki (FI); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 307 days.

(21) Appl. No.: 17/426,403

(22) PCT Filed: Feb. 13, 2020

(86) PCT No.: PCT/FI2020/050090
§ 371 (c)(1),
(2) Date: Jul. 28, 2021

(87) PCT Pub. No.: WO2020/165503
PCT Pub. Date: Aug. 20, 2020

(65) Prior Publication Data
US 2022/0104292 A1 Mar. 31, 2022

Related U.S. Application Data

(60) Provisional application No. 62/806,579, filed on Feb. 15, 2019.

(51) Int. Cl.
H04W 76/15 (2018.01)
H04L 5/00 (2006.01)
H04W 76/12 (2018.01)

(52) U.S. Cl.
CPC .......... *H04W 76/15* (2018.02); *H04L 5/0035* (2013.01); *H04W 76/12* (2018.02)

(58) Field of Classification Search
None
See application file for complete search history.

(56) References Cited

U.S. PATENT DOCUMENTS

| 2018/0199315 A1 | 7/2018 | Hong et al. |
| 2018/0279169 A1 | 9/2018 | Wang et al. |

(Continued)

FOREIGN PATENT DOCUMENTS

| CN | 109076628 A | 12/2018 |
| CN | 109246783 A | 1/2019 |

(Continued)

OTHER PUBLICATIONS

Ericsson, "Data Duplication and Link Selection for URLLC in NR", 3GPP TSG-RAN WG2 #AH, R2-1700428, (Jan. 17-19, 2017), 3 pages.

(Continued)

*Primary Examiner* — Anh Vu H Ly
(74) *Attorney, Agent, or Firm* — Lippes Mathias LLP

(57) ABSTRACT

A method, apparatus and computer program product establish at least two redundant protocol data unit sessions to at least one user equipment. The at least two redundant protocol data unit sessions are established based on dual connectivity in a radio access network. The method, apparatus and computer program product collect network status information related to the at least two redundant protocol data unit sessions. The method, apparatus and computer program product configure a set of protocol data unit session switching patterns for the at least two redundant protocol data unit sessions based on the real-time network status information.

15 Claims, 7 Drawing Sheets

(56) References Cited

U.S. PATENT DOCUMENTS

| | | | |
|---|---|---|---|
| 2020/0107213 A1 | 4/2020 | Park et al. | |
| 2020/0322256 A1 | 10/2020 | Tang | |
| 2021/0120450 A1* | 4/2021 | Peng | ............... H04W 28/22 |
| 2021/0359926 A1* | 11/2021 | Miklós | ............... H04L 43/0817 |
| 2022/0070952 A1* | 3/2022 | Sharma | ............... H04W 76/34 |

FOREIGN PATENT DOCUMENTS

| | | | | |
|---|---|---|---|---|
| EP | 3 585 093 A1 | | 12/2019 | |
| EP | 3846411 A1 | * | 7/2021 | ............... H04L 1/08 |
| WO | WO 2018/170855 A1 | | 9/2018 | |
| WO | WO-2020030720 A1 | * | 2/2020 | ............... H04L 1/22 |
| WO | WO-2020074091 A1 | * | 4/2020 | ............. H04L 41/06 |
| WO | WO-2020091449 A1 | * | 5/2020 | ........... H04L 1/1642 |
| WO | WO-2020104023 A1 | * | 5/2020 | |
| WO | WO-2020169875 A1 | * | 8/2020 | ......... H04L 41/0654 |

OTHER PUBLICATIONS

Extended European Search Report for European Application No. 20755982.4 dated Oct. 12, 2022, 16 pages.

Qualcomm Incorporated, "Analysis of URLLC Solutions Using DC", SA WG2 Meeting #129bis, S2-1811944, (Nov. 26-30, 2018), 18 pages.

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.0.0, Dec. 2018, pp. 1-76.

International Search Report and Written Opinion received for corresponding Patent Cooperation Treaty Application No. PCT/FI2020/050090, dated May 5, 2020, 14 pages.

"Redundant User Plane Paths based on Dual Connectivity", 3GPP TSG-SA WG2 Meeting #127bis, S2-184862, Agenda : 6.20, Ericsson, May 28-Jun. 1, 2018, 5 pages.

Office Action received for corresponding Chinese Patent Application No. 202080014551.7, dated Jan. 18, 2024, 8 pages of Office Action and no page of translation available.

Office Action received for corresponding Chinese Patent Application No. 202080014551.7, dated Apr. 19, 2024, 7 pages of Office Action and no page of translation available.

"3rd Generation Partnership Project; Technical Specification Group Services and System Aspects; Procedures for the 5G System (5GS); Stage 2 (Release 18)", 3GPP TS 23.502, V18.5.0, Mar. 2024, pp. 1-924.

* cited by examiner

METHOD AND APPARATUS FOR HANDLING PROTOCOL DATA UNIT SESSIONS IN A COMMUNICATION SYSTEM

RELATED APPLICATION

This application claims priority to PCT Application No. PCT/FI2020/050090, filed on Feb. 13, 2020, which claims priority to U.S. Provisional Application No. 62/806,579, filed on Feb. 15, 2019, each of which is incorporated herein by reference in its entirety.

CROSS-REFERENCE TO RELATED APPLICATION

This patent application claims priority from U.S. Provisional Patent Application Ser. No. 62/806,579, titled "METHOD AND APPARATUS FOR HANDLING REDUNDANT PROTOCOL DATA UNIT SESSIONS IN A COMMUNICATION SYSTEM," filed Feb. 15, 2019, which is incorporated herein by reference in its entirety.

TECHNICAL FIELD

An example embodiment of the present invention generally relates to handling redundant protocol data unit sessions in a communication system, such as a fifth generation (5G) system.

BACKGROUND

In order to ensure high reliability of transmission, redundant transmission of user data is supported in communication systems such as a 5G system. The key points in supporting redundant transmission of user data in communication systems such as a 5G system include: how to make decision on enabling redundant transmission or not for a specific quality of service (QoS) flow, how to replicate the data packets in user equipment (UE)/radio access network (RAN)/user plane function (UPF), when redundancy is needed or the like. However, a number of deficiencies and issues associated with supporting redundant transmission of user data in communication systems remain.

BRIEF SUMMARY

A method, apparatus and computer program product are provided in accordance with an example embodiment to handle redundant protocol data unit sessions in a communication system, such as a fifth generation (5G) system.

In one example embodiment, a method is provided that includes establishing at least two redundant protocol data unit sessions to at least one user equipment. The at least two redundant protocol data unit sessions are established based on dual connectivity in a radio access network. The method further includes collecting network status information related to the at least two redundant protocol data unit sessions. The method further includes configuring a set of protocol data unit session switching patterns for the at least two redundant protocol data unit sessions based on the network status information. The method further includes causing transmission of an indication of the set of protocol data unit session switching patterns to the at least one user equipment and the radio access network.

In some implementations of such a method, the method further includes receiving an indication, from the radio access network, of a selected protocol data unit session switching pattern from the indicated set of protocol data unit session switching patterns. In some embodiments, the network status information related to the at least two redundant protocol data unit sessions comprises one or more of: availability of disjoint transport layer paths, availability of independent core network and radio access network nodes, or transport layer and radio load status. In some embodiments, the network status information is collected by a session management function. In some embodiments, the set of protocol data unit session switching patterns include one or more of: no redundancy, sporadic redundancy, selective redundancy, or full redundancy.

In another example embodiment, an apparatus is provided that includes processing circuitry and at least one memory including computer program code for one or more programs with the at least one memory and the computer program code configured to, with the processing circuitry, cause the apparatus at least to establish at least two redundant protocol data unit sessions to at least one user equipment. The at least two redundant protocol data unit sessions are established based on dual connectivity in a radio access network. The computer program code is further configured to, with the at least one processor, cause the apparatus to collect network status information related to the at least two redundant protocol data unit sessions. The computer program code is further configured to, with the at least one processor, cause the apparatus to configure a set of protocol data unit session switching patterns for the at least two redundant protocol data unit sessions based on the network status information. The computer program code is further configured to, with the at least one processor, cause the apparatus to cause transmission of an indication of the set of protocol data unit session switching patterns to the at least one user equipment and the radio access network.

In some implementations of such an apparatus, the computer program code is further configured to, with the processing circuitry, cause the apparatus to receive an indication, from the radio access network, of a selected protocol data unit session switching pattern from the indicated set of protocol data unit session switching patterns. In some embodiments, the network status information related to the at least two redundant protocol data unit sessions comprises one or more of: availability of disjoint transport layer paths, availability of independent core network and radio access network nodes, or transport layer and radio load status. In some embodiments, the network status information is collected by a session management function. In some embodiments, the set of protocol data unit session switching patterns include one or more of: no redundancy, sporadic redundancy, selective redundancy, or full redundancy.

In another example embodiment, a computer program product is provided that includes at least one non-transitory computer-readable storage medium having computer executable program code instructions stored therein with the computer executable program code instructions comprising program code instructions configured, upon execution, to establish at least two redundant protocol data unit sessions to at least one user equipment. The at least two redundant protocol data unit sessions are established based on dual connectivity in a radio access network. The computer executable program code instructions comprise program code instructions that are further configured, upon execution, to collect network status information related to the at least two redundant protocol data unit sessions. The computer executable program code instructions comprise program code instructions that are further configured, upon execution, to configure a set of protocol data unit session switching patterns for the at least two redundant protocol data unit sessions based on the real-time network status information. The computer executable program code instructions comprise program code instructions that are further configured, upon execution, to cause transmission of an indication of the set of protocol data unit session switching patterns to the at least one user equipment and the radio access network.

In some implementations of such an apparatus, the computer executable program code instructions comprise program code instructions that are further configured, upon execution, to receive an indication, from the radio access network, of a selected protocol data unit session switching pattern from the indicated set of protocol data unit session switching patterns. In some embodiments, the network status information related to the at least two redundant protocol data unit sessions comprises one or more of: availability of disjoint transport layer paths, availability of independent core network and radio access network nodes, or transport layer and radio load status. In some embodiments, the network status information is collected by a session management function. In some embodiments, the set of protocol data unit session switching patterns include one or more of: no redundancy, sporadic redundancy, selective redundancy, or full redundancy.

In another example embodiment, an apparatus is provided that includes means for establishing at least two redundant protocol data unit sessions to at least one user equipment. The at least two redundant protocol data unit sessions are established based on dual connectivity in a radio access network. The apparatus further includes means for collecting network status information related to the at least two redundant protocol data unit sessions. The apparatus further includes means for configuring a set of protocol data unit session switching patterns for the at least two redundant protocol data unit sessions based on the network status information. The apparatus further includes means for causing transmission of an indication of the set of protocol data unit session switching patterns to the at least one user equipment and the radio access network.

In some implementations of such an apparatus, the apparatus further includes means for receiving an indication, from the radio access network, of a selected protocol data unit session switching pattern from the indicated set of protocol data unit session switching patterns. In some embodiments, the real-time network status information related to the at least two redundant protocol data unit sessions comprises one or more of: availability of disjoint transport layer paths, availability of independent core network and radio access network nodes, or transport layer and radio load status. In some embodiments, -time network status information is collected by a session management function. In some embodiments, the set of protocol data unit session switching patterns include one or more of: no redundancy, sporadic redundancy, selective redundancy, or full redundancy.

In another example embodiment, a method is provided that includes receiving an indication of a set of protocol data unit session switching patterns from a core network. The method further includes selecting a protocol data unit session switching pattern from the indicated set of protocol data unit session switching patterns. The method further includes causing transmission of an indication of the selected protocol data unit session switching pattern from the indicated set of protocol data unit session switching patterns to the core network.

In another example embodiment, an apparatus is provided that includes processing circuitry and at least one memory including computer program code for one or more programs with the at least one memory and the computer program code configured to, with the processing circuitry, cause the apparatus at least to receive an indication of a set of protocol data unit session switching patterns from a core network. The computer program code is further configured to, with the at least one processor, cause the apparatus to select a protocol data unit session switching pattern from the indicated set of protocol data unit session switching patterns. The computer program code is further configured to, with the at least one processor, cause the apparatus to cause transmission of an indication of the selected protocol data unit session switching pattern from the indicated set of protocol data unit session switching patterns to the core network.

In another example embodiment, a computer program product is provided that includes at least one non-transitory computer-readable storage medium having computer executable program code instructions stored therein with the computer executable program code instructions comprising program code instructions configured, upon execution, to receive an indication of a set of protocol data unit session switching patterns from a core network. The computer executable program code instructions comprise program code instructions that are further configured, upon execution, to select a protocol data unit session switching pattern from the indicated set of protocol data unit session switching patterns. The computer executable program code instructions comprise program code instructions that are further configured, upon execution, to cause transmission of an indication of the selected protocol data unit session switching pattern from the indicated set of protocol data unit session switching patterns to the core network.

In another example embodiment, an apparatus is provided that includes means for receiving an indication of a set of protocol data unit session switching patterns from a core network. The apparatus further includes means for selecting a protocol data unit session switching pattern from the indicated set of protocol data unit session switching patterns. The apparatus further includes means for causing transmission of an indication of the selected protocol data unit session switching pattern from the indicated set of protocol data unit session switching patterns to the core network.

BRIEF DESCRIPTION OF THE DRAWINGS

Figure 1:
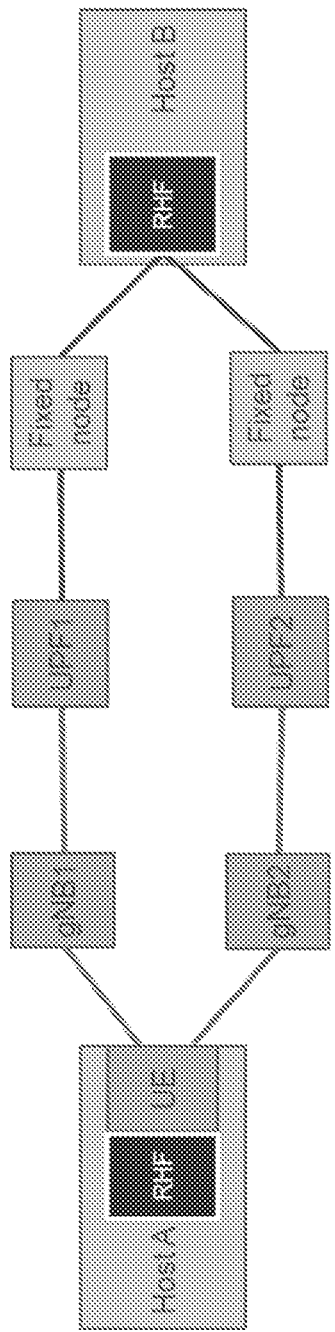
Figure 2:
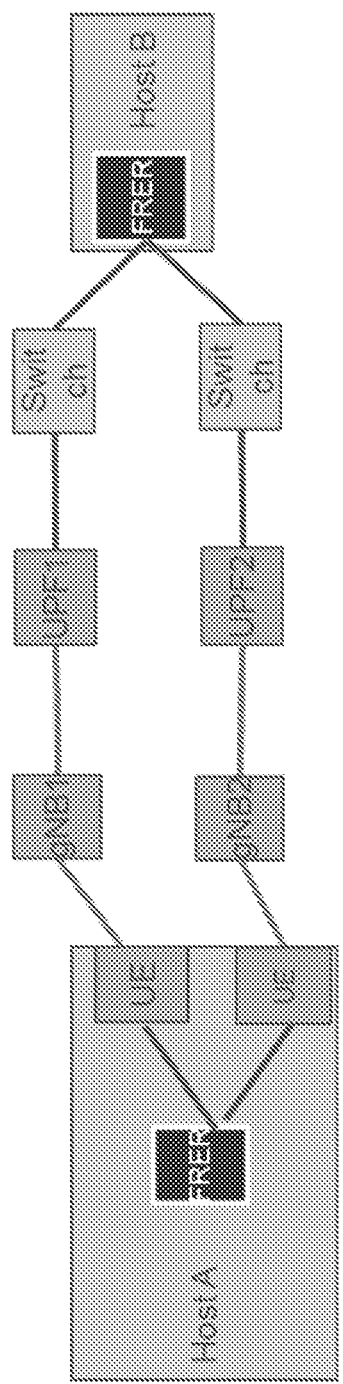
Figure 3:
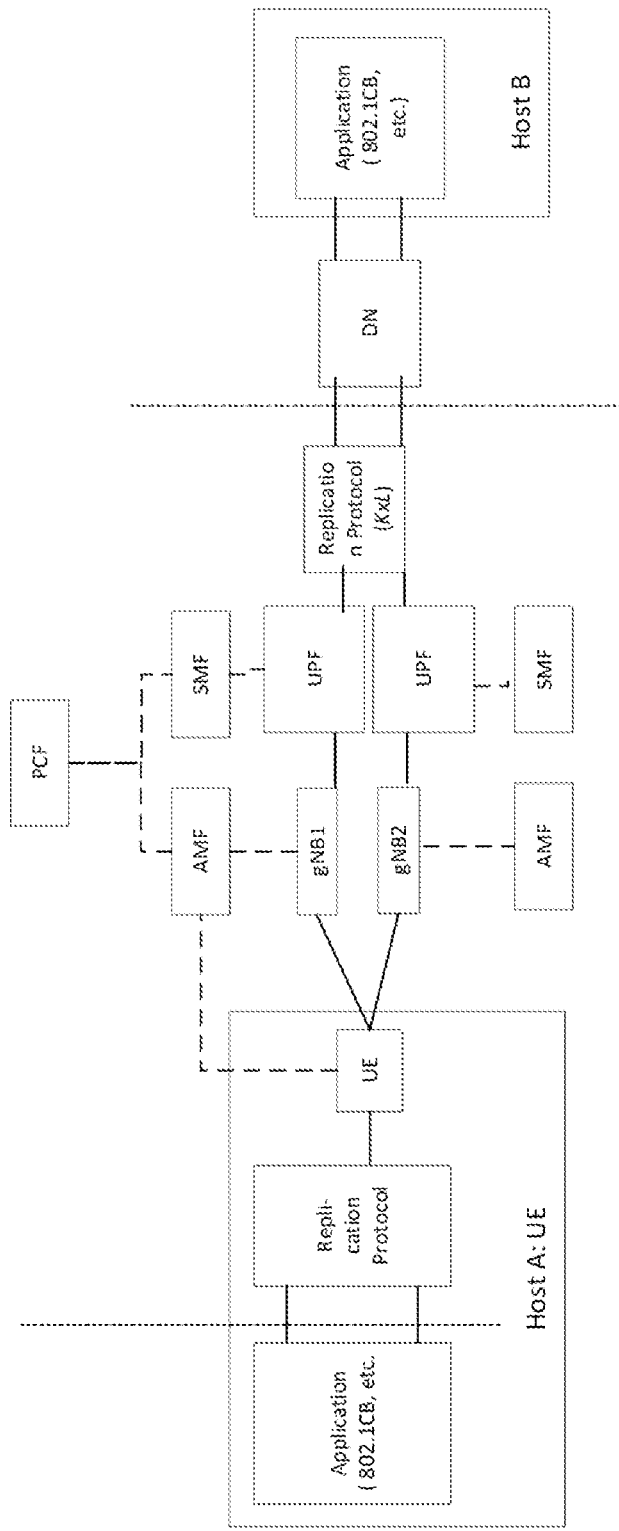
Figure 4:
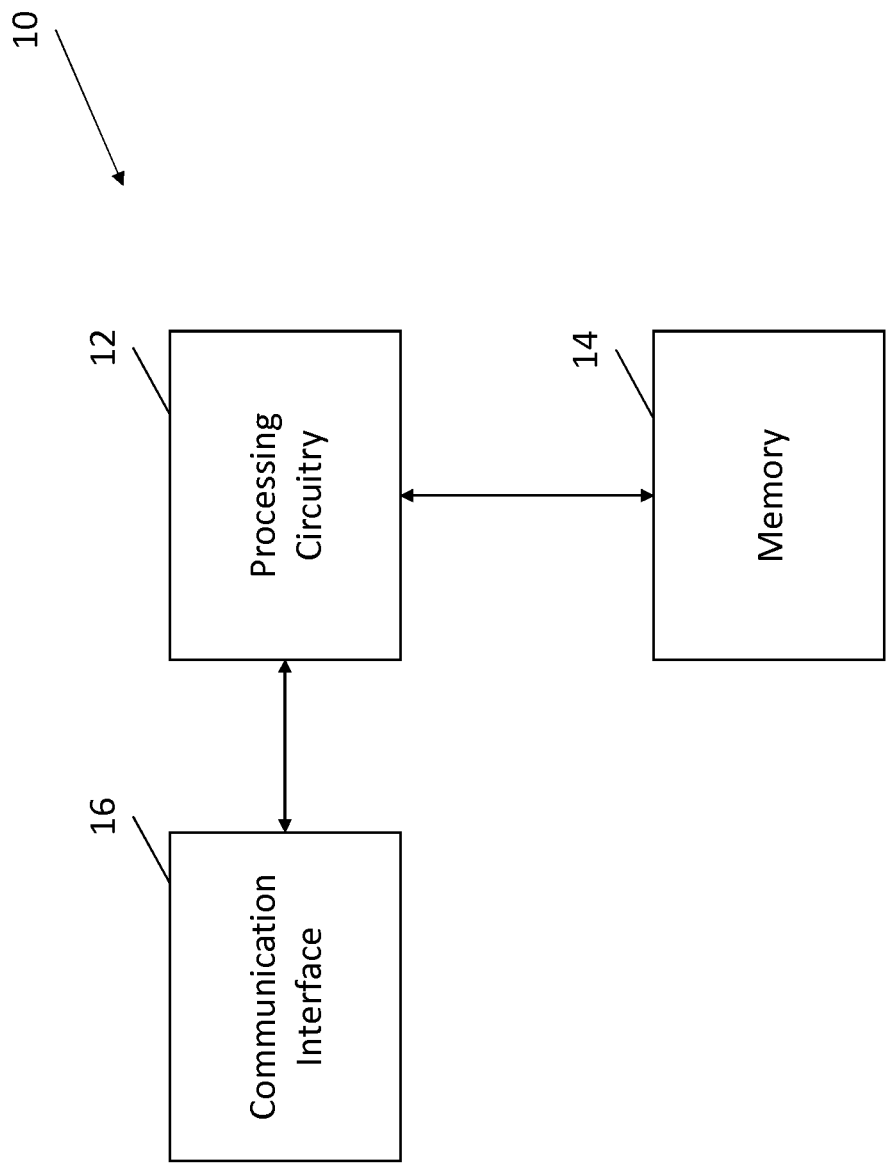
Figure 5:
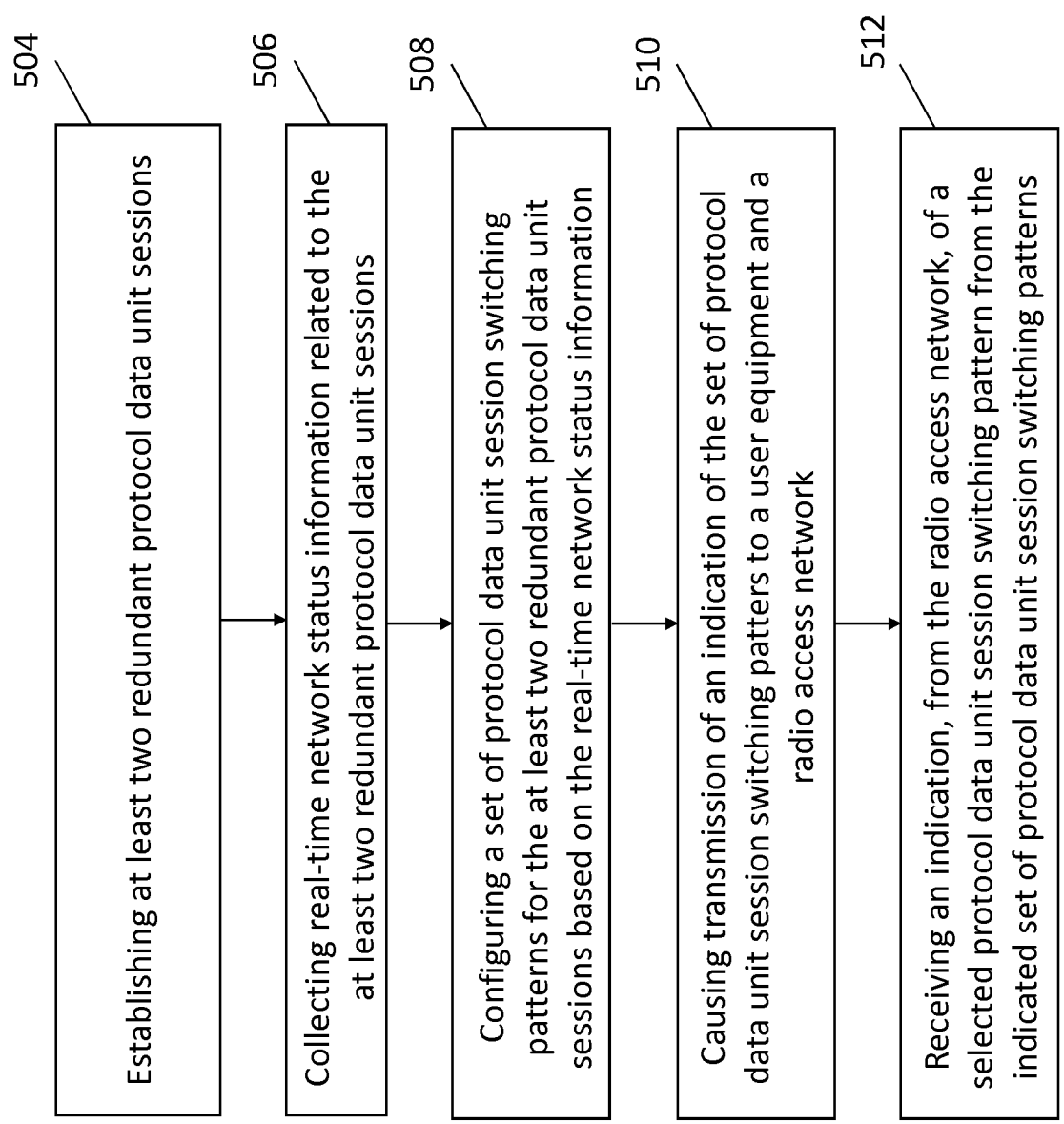
Figure 6:
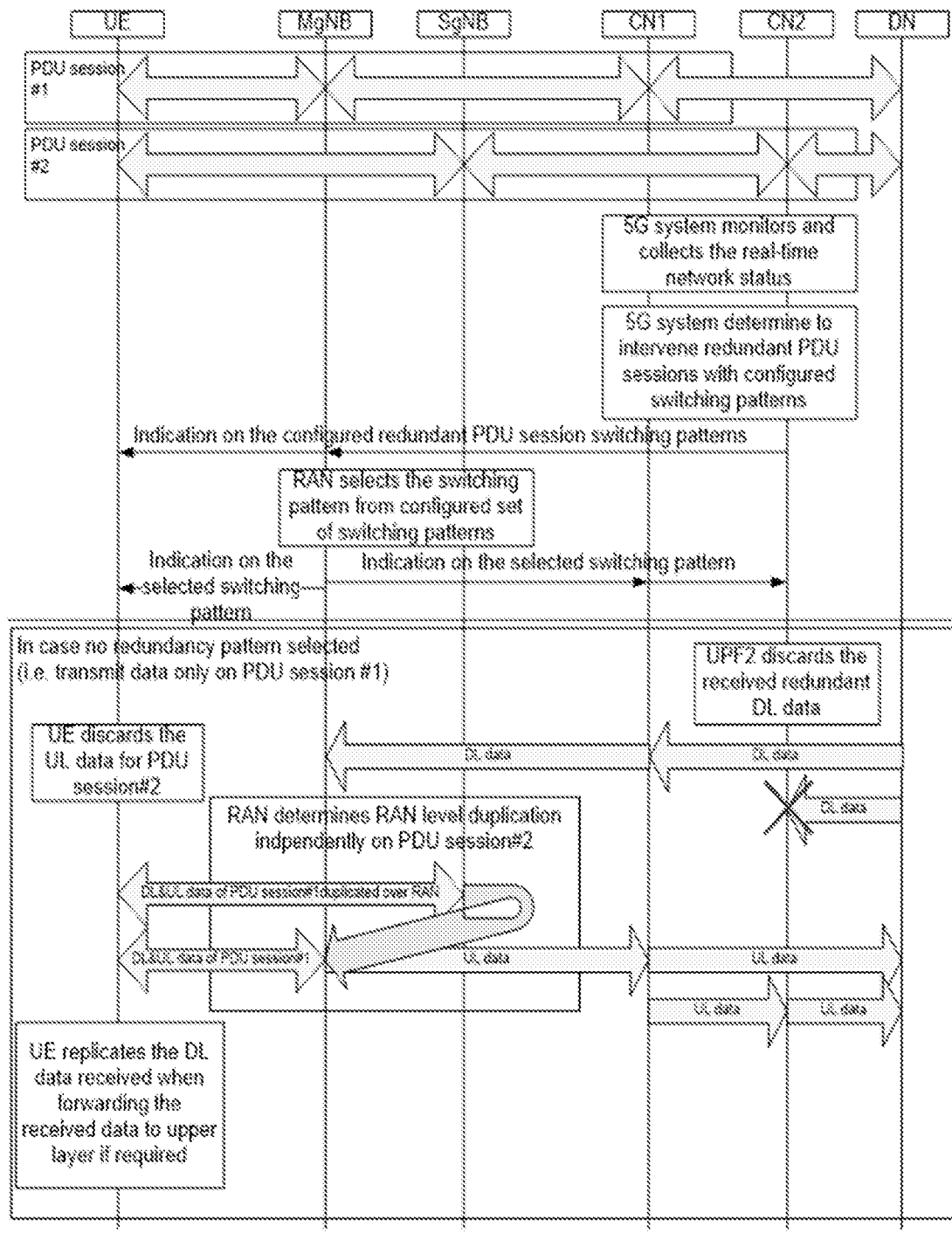
Figure 7:
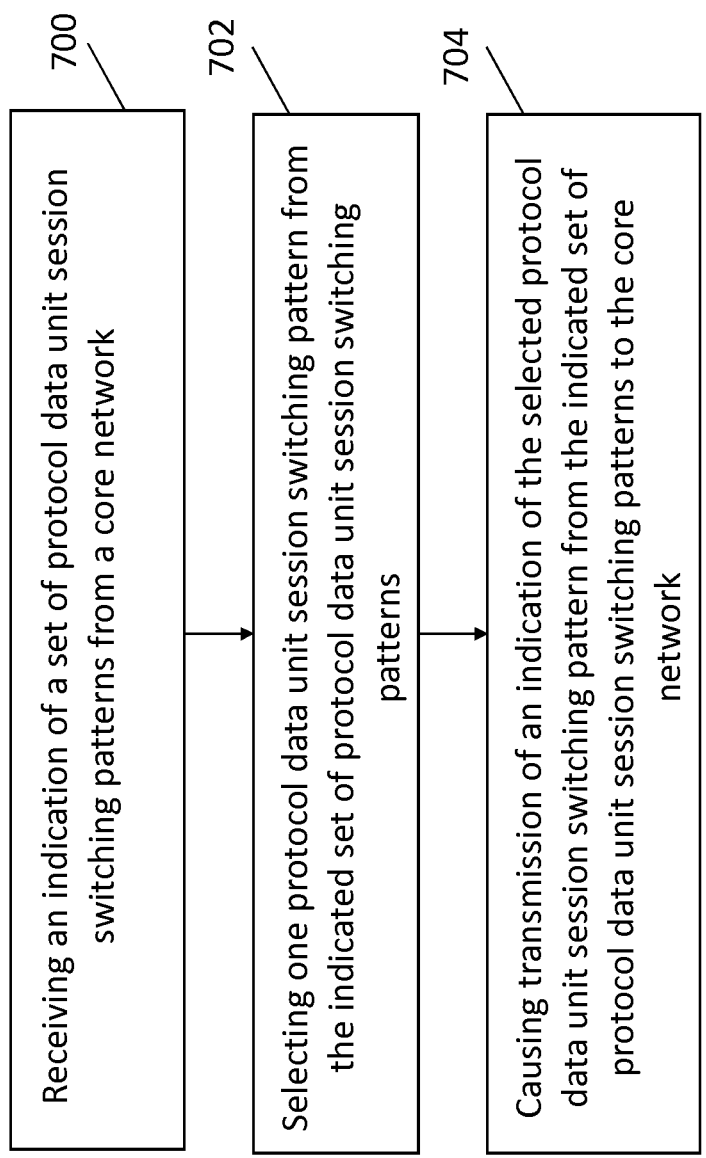

Having thus described certain example embodiments of the present disclosure in general terms, reference will hereinafter be made to the accompanying drawings, which are not necessarily drawn to scale, and wherein:

FIG. 1 illustrates an example configuration to handle redundant protocol data unit sessions in a communication system;

FIG. 2 illustrates another example configuration to handle redundant protocol data unit sessions in a communication system;

FIG. 3 illustrates another example configuration to handle redundant protocol data unit sessions in a communication system;

FIG. 4 is a block diagram of an apparatus that may be specifically configured in accordance with an example embodiment of the present disclosure;

FIG. 5 is a flowchart illustrating a set of operations performed, such as by the apparatus of FIG. 4, in accordance with an example embodiment of the present disclosure;

FIG. 6 is a signal flow diagram related to FIG. 5, in accordance with an example embodiment of the present disclosure; and FIG. 7 is a flowchart illustrating a set of operations performed, such as by the apparatus of FIG. 4, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

In order to ensure high reliability of transmission, redundant transmission of user data is supported in communication systems such as a 5G system. The key points in supporting redundant transmission of user data in communication systems such as a 5G system include: how to make decision on enabling redundant transmission or not for a specific QoS flow, how to replicate the data packets in UE/RAN/UPF, when the redundancy needed or the like.

The $3^{rd}$ Generation Partnership Project (3GPP) technical report (TR) 23.725 section included a number of proposed solutions for supporting redundant user plane transmission. The first configuration illustrated in FIG. 1 operates by providing redundant user plane paths based on dual connectivity.

The first configuration will enable a terminal device to set up two redundant protocol data unit (PDU) Sessions over the 5G network, so that the network will attempt to make the paths of the two redundant PDU sessions independent whenever that is possible. It is possible to rely on upper layer protocols, such as the IEEE TSN (Time Sensitive Networking) FRER (Frame Replication and Elimination for Reliability), to manage the replication and elimination of redundant packets/frames over the duplicate paths which can span both the 3GPP segments and possibly fixed network segments as well.

As illustrated in FIG. 1, the 3GPP network provides two paths from the device: the first PDU Session spans from the user equipment (UE) via next generation Node B (gNB)1 to user plane function (UPF)1 acting as the PDU Session Anchor, and the second PDU Session spans from the UE via gNB2 to UPF2 acting as the PDU Session Anchor. Based on these two independent PDU Sessions, two independent paths are set up, which may span even beyond the 3GPP network. In the example shown in the FIG. 1 two paths are set up between Host A in the device and Host B, with some (optional) fixed intermediate nodes. In order to enable such a configuration, the following features are supported (one or more of which may be applicable to other solutions, methods, apparatuses, and computer program products disclosed herein):

RAN supports dual connectivity, and RAN coverage is sufficient for dual connectivity in the target area (e.g., it is possible for UE to connect to at least two independent gNBs using dual connectivity, for example, by operating the gNBs in different frequencies).

UEs support dual connectivity.

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

The operation of the redundant user plane paths is made sufficiently independent, to the extent deemed necessary by the operator, e.g., independent power supplies.

Another configuration proposed is illustrated in FIG. 2; the configuration illustrated in FIG. 2 deploys at least two UEs on one single device and operates these UEs more or less like independent UEs. This solution will enable a terminal device to set up multiple redundant PDU Sessions over the 5G network, so that the network will attempt to make the paths of the multiple redundant PDU sessions independent whenever that is possible. It is possible to rely on upper layer protocols, such as the IEEE TSN (Time Sensitive Networking), to manage the replication and elimination of redundant packets/frames over the multiple paths which can span both the 3GPP segments and possibly fixed network segments as well.

As illustrated in FIG. 2, the first PDU Session spans from the UE1 via gNB1 to UPF1, while the second PDU Session spans from the UE2 via gNB2 to UPF2. Based on these two independent PDU Sessions, two independent paths are set up, which may span even beyond the 3GPP network. This solution makes use of the integration of multiple UEs into the device, and assumes a RAN deployment where redundant coverage by multiple gNBs is generally available. Multiple PDU Sessions are set up from the UEs, which use independent RAN (gNB) and core network (CN) (such as UPF) entities. For example, two UEs, UE1 and UE2 are connected to gNB1 and gNB2, respectively. UE1 sets up a PDU Session via gNB1 to UPF1, and UE2 sets up a PDU Session via gNB2 to UPF2. UPF1 and UPF2 connect to the same Data Network (DN), even though the traffic via UPF1 and UPF2 might be routed via different user plane nodes within the DN. UPF1 and UPF2 are controlled by session management functions (SMF)1 and SMF2, respectively.

In order to enable such a configuration, the following features are supported (one or more of which may be applicable to other solutions, methods, apparatuses, and computer program products disclosed herein):

Terminal devices integrate multiple UEs which can connect to different gNBs independently.

RAN coverage is redundant in the target area: it is possible to connect to multiple gNBs from the same location. To ensure that the two UEs connect to different gNBs, the gNBs operate such that the selection of gNBs can be distinct from each other (e.g. gNBs operating in different frequencies, etc.).

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

The operation of the redundant user plane paths is made sufficiently independent, to the extent deemed necessary by the operator, e.g., independent power supplies.

Both of these proposed configurations involve setting up two disjoint redundant user plane paths in a 5G system either from one UE or two UEs for support of high reliability. The setup of two or more redundant paths is rather static for 5G system when a UE requests the different PDU sessions setup. A 5G system does not have much flexibility on handling of these two redundant PDU sessions in proposed solution #1 and #2. However, such static and blind support of the redundant PDU sessions by a 5G system may not always provide high reliability as expected. For instance, the data replication into two or more PDU session may further increase the load of the radio access network (RAN) and thus introduce more radio interference, which in turn may negatively impact the data transmission reliability over the radio links and hence impact the end-to-end reliability. On the other hand, the static and blind support of redundant user plane paths for high reliability may also introduce unnecessary usage of network resources if one PDU session is sufficient to provide the required QoS. In such case, a 5G system, from the perspectives of network resource utilization and network performance, should prefer to serve the end-to-end (E2E) duplication for the UE with one PDU session while not impacting higher layer duplication required by an application.

Another configuration proposed in the TR 23.725 and illustrated in FIG. 3 introduced replicator functions to guide the lower layers to ensure their corresponding latency/availability/reliability requirements are fulfilled. This configuration introduces a replicator that allows the 5G system to be aware (e.g. detect or have explicit information) that two or more "streams" of replicated packets belong together, and guide the lower layers to ensure these packets get an optimized treatment in the 5G system depending on whether the streams are terminated in a single UE or by two different UEs that belong together within the same host.

However, such a configuration only considers avoidance of unnecessary duplication in different layers (e.g. in and above RAN level), which still fails to solve the problem of potential negative impact of the reliability by static redundant PDU session handling in the case of high network load or waste of the network resources by unnecessary redundant data transmission over two PDU sessions within a 5G system.

Aiming to provide more flexible and dynamic use and control of higher layer replication on a PDU session level and lower layer duplication on a Radio Access Network (RAN) level (e.g. Packet Data Convergence Protocol (PDCP) duplication with multi-connectivity) within a 5G system, a method, apparatus and computer program product are provided in accordance with an example embodiment to handle redundant protocol data unit sessions.

On a high-level, the method, apparatus and computer program product provided are based on the notion that a communications system, such as a 5G system, can make a decision to intervene at least one of the PDU session by configuring a set of switching patterns between the redundant PDU sessions. By way of example, but not of limitation, the method, apparatus and computer program product are hereafter described in conjunction with a 5G system. However, the method, apparatus and computer program product may be utilized in conjunction with other communication systems in other embodiments. The configured switching patterns are indicated to the RAN and UE. The RAN then has the flexibility to select one of the configured patterns based on e.g. the radio resource status and conditions and inform a CN and UE on the selected patterns to trigger the corresponding handling of the redundant PDU sessions in the system.

FIG. 4 illustrates an example apparatus that may be provided to embody the various components in a communication system, for example, a portion of a core network, a gNB, a RAN, or the like. As illustrated in FIG. 4, the apparatus 10 of an example embodiment includes, is associated with or is otherwise in communication with processing circuitry 12, a memory 14, and a communication interface 16.

The processing circuitry 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image processing system) configured to employ an embodiment of the present disclosure by further configuration of the processor by instructions for performing the algorithms and/or operations described herein. The processing circuitry may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 5 the operations performed by a component of the communication system, such as a core network, which may be embodied by the apparatus illustrated in FIG. 4 in accordance with an example embodiment are illustrated.

As shown in block 504, the apparatus of the core network includes means, such as the communication interface 16 and/or the processing circuitry 12, for establishing at least two redundant PDU sessions. The at least two redundant protocol data unit sessions are established based on dual connectivity in a radio access network.

As shown in block 506, the apparatus of the core network includes means, such as the communication interface 16 and/or the processing circuitry 12, for collecting network status information, such as real-time network status information, related to the at least two redundant protocol data unit sessions. The information collected may include information regarding the availability of the disjoint transport layer paths, the availability of independent CN and RAN nodes, the transport layer and radio load status, or the like. In some embodiments, the information is monitored by relevant network nodes and may be collected by one network entity (e.g. SMF) that is responsible for making the PDU session intervention decision and configuring the set of switching patterns. In some embodiments, the RAN status information is maintained by the RAN to avoid extensive signalling overhead on the interface between the CN and RAN. Therefore, only critical radio load status (e.g. when full redundant transmission over two PDU sessions cannot be offered by RAN) may be reported to the CN. The RAN, based on the radio resource status, such as the real-time radio resource status, may have the flexibility to determine the handling of the redundant PDU sessions by selecting the switching pattern from the configured set of patterns as described below.

In some embodiments, in addition to network resource and load status monitoring, the apparatus, such as the processing circuitry 12 or the like, is configured to monitor the user plane traffic of the relevant PDU sessions so that deviation from expected traffic pattern can be detected. Considering the possible causes for the deviation may be user plane packets lost in a) the RAN or b) CN transport, the CN (e.g. UPF), such as the processing circuitry, may determine whether the cause is case a) or case b) for example by examining general packet radio service (GPRS) tunneling protocol (GTP) sequence numbers. If there is a deviation from a traffic pattern and if there is a gap in sequence numbers of GTP-U PDUs received by the CN (UPF) then the problem is most likely in the CN transport and not in the RAN. Similarly, no gap in the sequence numbers of GTP-U PDUs would indicate problems in the RAN.

As shown in block 508, the apparatus of the core network includes means, such as the processing circuitry 12, for configuring a set of protocol data unit session switching patterns for the at least two redundant protocol data unit sessions based on the network status information, such as the real-time network status information. In some embodiments, QoS requirements and/or other information (e.g. the reliability or error model of application services related to the consecutive error) on services from an application if available, may also be utilized by the core network when configuring the set of PDU session switching patterns. In some embodiments, the configured switch patterns may include one or more of:

1. No redundancy—the data transmitted only on one PDU session;
2. Sporadic redundancy—the data always transmitted on one PDU session and selectively transmitted on another PDU session (e.g. every nth packet is transmitted on another PDU session);
3. Selective redundancy—the data selectively transmitted on both PDU sessions including the selective pattern on each PDU session;
4. Full redundancy—the data is transmitted on both PDU sessions always For different PDU session switching patterns, corresponding QoS attributes may be associated with each pattern in order to guarantee the overall QoS of the data flows required from the application layer regardless which switching session is selected by the RAN.

As shown in block 510, the apparatus of the core network includes means, such as the communication interface 16 and/or the processing circuitry 12, for causing transmission of an indication of the set of protocol data unit session switching patterns to a user equipment and a radio access network. In some embodiments, the indication of the set of protocol data unit session switching patterns may be transmitted to a user plane function as well.

As shown in block 512, the apparatus of the core network includes means, such as the communication interface 16 and/or the processing circuitry 12, for receiving an indication, from the radio access network, of a selected protocol data unit session switching pattern from the indicated set of protocol data unit session switching patterns.

By utilizing such PDU session switching patterns, the RAN may be able to provide optimized reliability by taking resource status and radio link into consideration and be able to find the right balance between redundancy and radio interference and select the appropriate switching pattern accordingly.

Referring now to FIG. 7 the operations performed by a component of a communication system, such as a 5G communication system, such as a RAN, which may be embodied by the apparatus illustrated in FIG. 4 in accordance with an example embodiment are illustrated. As shown in block 700, the apparatus of the RAN includes means, such as the communication interface 16 and/or the processing circuitry 12, for receiving an indication of a set of protocol data unit session switching patterns from a core network.

In some embodiments, based on real-time radio link and resource status, the apparatus of the RAN may, as illustrated in block 702 of FIG. 7, includes means, such as the processing circuitry 12 or the like, configured to select one of the switching patterns from the configured set to handle the redundant PDU sessions within system. For example, if the apparatus, such as the processing circuitry, of the RAN detects that the disjoint RAN resource availability is poor (e.g. due to high load of the radio resources in at least one of the RAN nodes connected to the UE, or the channel condition of the UE to the connected RAN nodes varies a lot due to more dynamic environment etc.), the apparatus, such as the processing circuitry, of the RAN may select the switching pattern that has less redundant transmission over the at least two PDU sessions as possible (e.g. the switching pattern of transmission only on one PDU session is selected if it is in the configured set of the patterns). By utilizing such switching patterns, a RAN has more flexibility to determine different higher layer duplication, e.g. PDCP duplication, dynamically based on real-time radio link and resource status of the multi-connectivity, resulting in better usage of resources and higher reliability. In some embodiments, the apparatus, such as the processing circuitry, of the RAN may determine on per-packet basis whether PDCP level duplication is used, to which RAN nodes and on which carrier in case of carrier aggregation the PDCP duplication can be used without concerns on avoiding unnecessary duplication that the other PDU session may have data transmission over the same RAN nodes. To facilitate such dynamic PDCP level duplication, the corresponding data radio bearers (DRBs) may be configured for duplicated and non-duplicated data transmission in each RAN nodes.

Upon selecting the switching pattern from the configured set of patterns, the apparatus of the RAN may include means, such as the processing circuitry 12, the communication interface 16 or the like, configured to indicate, as illustrated in block 704 of FIG. 7, by causing transmission of an indication, to the CN and UE on the selected pattern so that the CN and UE may handle the redundant PDU sessions accordingly. As illustrated in FIG. 6, if the RAN selects the switching pattern of no redundancy, the PDU session #2 may be deactivated. Then the CN as a whole (e.g. UPF) and UE may delete the data forwarded from application layer to PDU session #2. PDU session 1 and PDU session 2 may utilize master gNB and secondary gNB respectively. The MgNB controls the selection of SgNB and the setup of the dual connectivity feature. PDU session 1 and PDU session 2 may utilize different UPFs.

If the impact on the higher layer replication from the application layer of the communications system is preferred to be avoided by the intervention of the redundant PDU sessions within the system, the UE and the relevant network (NW) node (e.g. UPF) may be configured to recover the intervention of the PDU session towards to the application layer or data network (DN). For instance, the UE, upon receiving the selection of the switching pattern of no redundancy (or the deactivation of the PDU session #2) as illustrated in FIG. 6, may determine to replicate the received downlink (DL) data packet before forwarding the received data to the upper layer such that that the upper layer sees the replicated data are received from two PDU sessions.

The NW node (e.g. UPF #1 handling PDU session #1) may be configured to replicate the received uplink (UL) data packet to another NW node (e.g. UPF #2 handing PDU session #2) that is involved in handling the intervened PDU session. However, if an upper layer (e.g. Redundancy Handling Function (RHF) and FRER (Frame Replication and Elimination for Reliability)) can handle the lack of the redundant data even in cast of deactivation of one PDU session, the replication of the received data in the UE and on the UPF side is not needed. Again, by utilizing such switching patterns, a RAN has more flexibility to determine the duplications dynamically based on real-time radio link and resource status of the multi-connectivity, resulting in better usage of resources and higher reliability.

As described above, FIGS. 5 and 7 include flowcharts of an apparatus 10, method, and computer program product according to certain example embodiments. It will be understood that each block of the flowcharts, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 5 and 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
    establishing at least two redundant protocol data unit sessions to at least one user equipment, wherein the at least two redundant protocol data unit sessions are established based on dual connectivity in a radio access network;
    collecting network status information related to the at least two redundant protocol data unit sessions;
    configuring a set of protocol data unit session switching patterns for the at least two redundant protocol data unit sessions based on the network status information; and
    causing transmission of an indication of the set of protocol data unit session switching patterns to the at least one user equipment and the radio access network;
    wherein the set of protocol data unit session switching patterns include one or more of: no redundancy, sporadic redundancy, selective redundancy, or full redundancy.

2. A method according to claim 1 further comprising:
    receiving an indication, from the radio access network, of a selected protocol data unit session switching pattern from the indicated set of protocol data unit session switching patterns.

3. A method according claim 1 wherein the network status information related to the at least two redundant protocol data unit sessions comprises one or more of: availability of disjoint transport layer paths, availability of independent core network and radio access network nodes, or transport layer and radio load status.

4. A method according to claim 1 wherein the network status information is collected by a session management function.

5. An apparatus comprising processing circuitry and at least one memory including computer program code for one or more programs, the at least one memory and the computer program code configured to, with the processing circuitry, cause the apparatus at least to:
    establish at least two redundant protocol data unit sessions to at least one user equipment, wherein the at least two redundant protocol data unit sessions are established based on dual connectivity in a radio access network;
    collect network status information related to the at least two redundant protocol data unit sessions;
    configure a set of protocol data unit session switching patterns for the at least two redundant protocol data unit sessions based on the network status information; and
    cause transmission of an indication of the set of protocol data unit session switching patterns to the at least one user equipment and the radio access network;
    wherein the set of protocol data unit session switching patterns include one or more of: no redundancy, sporadic redundancy, selective redundancy, or full redundancy.

6. An apparatus according to claim 5 wherein the at least one memory and the computer program code are further configured to, with the processing circuitry, cause the apparatus at least to receive an indication, from the radio access network, of a selected protocol data unit session switching pattern from the indicated set of protocol data unit session switching patterns.

7. An apparatus according to claim 5 wherein the network status information related to the at least two redundant protocol data unit sessions comprises one or more of: availability of disjoint transport layer paths, availability of independent core network and radio access network nodes, or transport layer and radio load status.

8. An apparatus according to claim 5 wherein the network status information is collected by a session management function.

9. A computer program product comprising at least one non-transitory computer-readable storage medium having computer executable program code instructions stored therein, the computer executable program code instructions comprising program code instructions configured, upon execution, to:
   establish at least two redundant protocol data unit sessions to at least one user equipment, wherein the at least two redundant protocol data unit sessions are established based on dual connectivity in a radio access network;
   collect network status information related to the at least two redundant protocol data unit sessions;
   configure a set of protocol data unit session switching patterns for the at least two redundant protocol data unit sessions based on the network status information; and
   cause transmission of an indication of the set of protocol data unit session switching patterns to the at least one user equipment and the radio access network;
   wherein the set of protocol data unit session switching patterns include one or more of: no redundancy, sporadic redundancy, selective redundancy, or full redundancy.

10. A computer program product according to claim 9 where the program code instructions are configured, upon execution, to receive an indication, from the radio access network, of a selected protocol data unit session switching pattern from the indicated set of protocol data unit session switching patterns.

11. A computer program product according to claim 9 wherein the network status information related to the at least two redundant protocol data unit sessions comprises one or more of: availability of disjoint transport layer paths, availability of independent core network and radio access network nodes, or transport layer and radio load status.

12. A computer program product according to claim 9 wherein the network status information is collected by a session management function.

13. A method comprising:
   receiving an indication of a set of protocol data unit session switching patterns from a core network, the set of protocol data unit session switching patterns being configured for at least two redundant protocol data unit sessions based on a network status information;
   selecting a protocol data unit session switching pattern from the indicated set of protocol data unit session switching patterns; and
   causing transmission of an indication of the selected protocol data unit session switching pattern from the indicated set of protocol data unit session switching patterns to the core network;
   wherein the set of protocol data unit session switching patterns include one or more of: no redundancy, sporadic redundancy, selective redundancy, or full redundancy.

14. An apparatus comprising processing circuitry and at least one memory including computer program code for one or more programs, the at least one memory and the computer program code configured to, with the processing circuitry, cause the apparatus at least to:
   receive an indication of a set of protocol data unit session switching patterns from a core network, the set of protocol data unit session switching patterns being configured for at least two redundant protocol data unit sessions based on a network status information;
   select a protocol data unit session switching pattern from the indicated set of protocol data unit session switching patterns; and
   cause transmission of an indication of the selected protocol data unit session switching pattern from the indicated set of protocol data unit session switching patterns to the core network;
   wherein the set of protocol data unit session switching patterns include one or more of: no redundancy, sporadic redundancy, selective redundancy, or full redundancy.

15. A computer program product comprising at least one non-transitory computer-readable storage medium having computer executable program code instructions stored therein, the computer executable program code instructions comprising program code instructions configured, upon execution, to:
   receive an indication of a set of protocol data unit session switching patterns from a core network, the set of protocol data unit session switching patterns being configured for at least two redundant protocol data unit sessions based on a network status information;
   select a protocol data unit session switching pattern from the indicated set of protocol data unit session switching patterns; and
   cause transmission of an indication of the selected protocol data unit session switching pattern from the indicated set of protocol data unit session switching patterns to the core network;
   wherein the set of protocol data unit session switching patterns include one or more of: no redundancy, sporadic redundancy, selective redundancy, or full redundancy.

* * * * *